US009607462B2

(12) United States Patent
Blemel et al.

(10) Patent No.: US 9,607,462 B2
(45) Date of Patent: Mar. 28, 2017

(54) SYSTEM FOR ANTI-TAMPER PARCEL PACKAGING, SHIPMENT, RECEIPT, AND STORAGE

(71) Applicants: Kenneth Gerald Blemel, Albuquerque, NM (US); Francis Edward Peter, Albuquerque, NM (US); Peter Andrew Blemel, Albuquerque, NM (US)

(72) Inventors: Kenneth Gerald Blemel, Albuquerque, NM (US); Francis Edward Peter, Albuquerque, NM (US); Peter Andrew Blemel, Albuquerque, NM (US)

( * ) Notice: Subject to any disclaimer, the term of this patent is extended or adjusted under 35 U.S.C. 154(b) by 0 days.

(21) Appl. No.: 14/218,576

(22) Filed: Mar. 18, 2014

(65) Prior Publication Data

US 2014/0270467 A1 Sep. 18, 2014

Related U.S. Application Data

(60) Provisional application No. 61/852,570, filed on Mar. 18, 2013.

(51) Int. Cl.
*G06K 9/00* (2006.01)
*G07D 7/20* (2016.01)
*G07D 7/12* (2016.01)

(52) U.S. Cl.
CPC .......... *G07D 7/2033* (2013.01); *G07D 7/122* (2013.01); *G07D 7/124* (2013.01)

(58) Field of Classification Search
CPC ............ Y10S 428/915; Y10S 428/916; Y10S 209/807; B65D 27/30; B65D 27/34
See application file for complete search history.

(56) References Cited

U.S. PATENT DOCUMENTS 4,749,084 A * 6/1988 Pereyra ...................... 206/459.1
4,760,919 A * 8/1988 Pereyra ...................... 206/484.2
4,890,763 A * 1/1990 Curiel .................... B65D 25/34 206/459.1
4,911,302 A * 3/1990 Butler ........................... 200/459
4,928,837 A * 5/1990 Curiel ........................... 215/250
4,945,708 A * 8/1990 Curiel .................... B65D 55/02 206/459.1
4,972,953 A * 11/1990 Friedman ............. B65D 55/026 206/459.1
4,998,989 A * 3/1991 Curiel ........................... 215/250
5,028,290 A * 7/1991 Curiel ..................... B65C 1/045 156/232
5,137,208 A * 8/1992 Wang ..................... B65D 55/02 206/807
5,207,377 A * 5/1993 Brecht ............................ 232/17
5,526,979 A * 6/1996 Mann .............................. 232/33
5,740,645 A * 4/1998 Raby ............................... 52/297
5,901,525 A * 5/1999 Doeringer et al. ............. 52/835
(Continued)

*Primary Examiner* — Aaron W Carter

(57) ABSTRACT

An apparatus and system for secure packaging, shipment, receipt and storage of mail, parcels and parcels is described. The apparatus includes an appliqué with a multitude of sensitized residue within that surround the parcel; the residue in the media forms a unique optical fingerprint, which is an exemplar image data for comparison. Substantial damage to one or more fibers alters the optical fingerprint pattern. The data is read and independently verified at waypoints and the destination. Comparing the current image data to the exemplar image data indicates damage or tampering.

9 Claims, 13 Drawing Sheets

(56) References Cited

U.S. PATENT DOCUMENTS

| | | | | |
|---|---|---|---|---|
| 5,938,113 | A * | 8/1999 | Kim | 232/47 |
| 6,247,642 | B1 * | 6/2001 | Wilson, Jr. | 232/47 |
| 6,375,071 | B1 * | 4/2002 | Kim | 232/47 |
| 6,690,464 | B1 * | 2/2004 | Lewis | G01N 21/253 250/339.02 |
| 6,707,381 | B1 * | 3/2004 | Maloney | 340/568.1 |
| 7,191,942 | B2 * | 3/2007 | Aptekar | 235/385 |
| 7,219,873 | B2 * | 5/2007 | Harwood | 248/519 |
| 7,252,220 | B1 * | 8/2007 | Shreve | 232/45 |
| 7,277,822 | B2 * | 10/2007 | Blemel | 702/183 |
| 7,347,358 | B2 * | 3/2008 | Ireland | B32B 27/36 235/379 |
| 7,350,689 | B1 * | 4/2008 | Campbell | 229/314 |
| 7,356,444 | B2 * | 4/2008 | Blemel | 702/183 |
| 7,590,496 | B2 * | 9/2009 | Blemel | 702/35 |
| 7,974,815 | B2 * | 7/2011 | Blemel | 702/183 |
| 7,988,035 | B2 * | 8/2011 | Cox et al. | 232/47 |
| 8,031,069 | B2 * | 10/2011 | Cohn et al. | 340/542 |
| 8,261,966 | B2 * | 9/2012 | Cox et al. | 232/47 |
| 8,274,389 | B2 * | 9/2012 | Teeter | 340/572.3 |
| 8,294,577 | B2 * | 10/2012 | Deak | 340/568.1 |
| 8,388,025 | B2 * | 3/2013 | Mrocki et al. | 283/80 |
| 8,533,075 | B1 * | 9/2013 | Sayers et al. | 705/28 |
| 8,620,821 | B1 * | 12/2013 | Goldberg et al. | 705/60 |
| 2002/0038199 | A1 * | 3/2002 | Blemel | 702/183 |
| 2002/0170970 | A1 * | 11/2002 | Ehrhart | 235/462.41 |
| 2002/0171745 | A1 * | 11/2002 | Ehrhart | 348/231.3 |
| 2003/0142130 | A1 * | 7/2003 | Kawaguchi et al. | 345/752 |
| 2004/0023397 | A1 * | 2/2004 | Vig et al. | 436/1 |
| 2004/0124242 | A1 * | 7/2004 | Critelli | G07B 17/00508 235/462.08 |
| 2005/0034420 | A1 * | 2/2005 | Radlinger et al. | 53/52 |
| 2006/0091208 | A1 * | 5/2006 | He | G06Q 10/087 235/385 |
| 2006/0091209 | A1 * | 5/2006 | He | G06K 7/10732 235/385 |
| 2006/0091221 | A1 * | 5/2006 | He | G06K 7/10851 235/470 |
| 2006/0095778 | A1 * | 5/2006 | He | G06Q 10/087 713/180 |
| 2006/0098842 | A1 * | 5/2006 | Levine | 382/101 |
| 2006/0102636 | A1 * | 5/2006 | Clifton | A47G 19/2272 220/709 |
| 2006/0200658 | A1 * | 9/2006 | Penkethman | 713/2 |
| 2007/0240227 | A1 * | 10/2007 | Rickman et al. | 726/27 |
| 2008/0089477 | A1 * | 4/2008 | Eshed et al. | 378/57 |
| 2010/0082151 | A1 * | 4/2010 | Young | G06Q 10/08 700/226 |
| 2010/0225738 | A1 * | 9/2010 | Webster | 348/36 |
| 2012/0106787 | A1 * | 5/2012 | Nechiporenko et al. | 382/103 |
| 2014/0201094 | A1 * | 7/2014 | Herrington et al. | 705/317 |
| 2014/0214438 | A1 * | 7/2014 | Ahmadi | 705/2 |
| 2014/0218452 | A1 * | 8/2014 | Li | B41J 11/002 347/100 |
| 2014/0270467 | A1 * | 9/2014 | Blemel et al. | 382/143 |

* cited by examiner

SYSTEM FOR ANTI-TAMPER PARCEL PACKAGING, SHIPMENT, RECEIPT, AND STORAGE

CROSS-REFERENCE TO RELATED APPLICATIONS

This application claims the benefit of Applicants' prior provisional application, No. 61/852,570, filed on Mar. 18, 2013, the content of which is incorporated herein by reference in its entirety.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

LIST OF REFERENCED DOCUMENTS

U.S. PATENT DOCUMENTS

| Patent Number | Issue Date | Inventor |
|---|---|---|
| 7,590,496 | September 2009 | Blemel |
| 7,356,444 | April 2008 | Blemel |
| 7,277,822 | October 2007 | Blemel |
| 7,974,815 | July 2011 | Blemel |
| 7,988,035 | August 2011 | Cox, et al |
| 8,031,069 | October 2011 | Cohn, et al |
| 8,294,577 | October 2012 | Deak |
| 8,388,025 | March 2013 | Mrocki et al |
| 8,274,389 | September 2012 | Teeter |
| 450,379 | April 1891 | Sinclaire |
| 722,323 | March 1903 | Parker |
| 5,207,377 | May 1993 | Brecht |
| 5,526,979 | June 1996 | Mann |
| 5,740,645 | April 1998 | Raby |
| 5,901,525 | May 1999 | Doeringer et al. |
| 5,938,113 | August 1999 | Kim |
| 6,247,642 | June 2001 | Wilson, Jr. |
| 6,375,071 | April 2002 | Kim |
| 7,219,873 | May 2007 | Harwood |
| 7,252,220 | August 2007 | Shreve |
| 8,261,966 | September 2012 | Cox, et al. |
| 8,620,821 | December 2013 | Goldberg, et al. |

Non Patent Documents

1. A. Mallet, "A maximum likelihood estimation method for random coefficient regression models," 1986, Biometrika, 73:3, pgs 645-656.
2. G. A. Seber and C. J. Wild, "Nonlinear Regression," 2003, Wiley, Hoboken.
3. J. Kaipio and E. Somersalo, "Statistical and Computational Inverse Problems," 2004, Vol 160, Applied Mathematical Sciences, Springer.
4. H. T. Banks, Zackary R. Kenz, and W. Clayton Thompson, "A review of selected techniques in inverse problem nonparametric probability distribution estimation," May 2012m CRSC-TR12-13, North Carolina State University, J. Inverse and Ill-Posed Problems.
5. D. Pless and G. F. Luger, "Toward General Analysis of Recursive Probability Models," 2001, Proceedings of the Uncertainty in Artificial Intelligence Conference.

6. K. Kersting and L. De Raedt, "Bayesian Logic Programs," 2000, Proceedings of the 10th International Conference on Inductive Logic Programming.
7. D. Koller and A. Pfeffer, "Probabilistic Frame Based System," 1998 Proceedings AAAI, AAAI Press.
8. N. Friedman, L. Getoor, D. Koller, and A. Pfeffer, "Learning Probabilistic Relational Models," 1999, Proceedings IJCAI Morgan Kaufman.
9. D. Pless and G. F. Luger, "A First-Order Stochastic Modeling Language for Diagnosis," 2005 FLAIRS Proceedings, Clearwater Beach, Fla.
10. C. R. Stern, "Doctoral Dissertation: Diagnosis Using Schema-Based Abduction," 1996, University of New Mexico.
11. P. Haddaway, "Generating Bayesian Networks from Probability Logic Bases," 1993, TR-93-11-01, University of Wisconsin, Milwaukee.
12. "Coolest goods for on the go," Mar. 14, 2014, USA Today, page 3D.
13. J. Wrigley, "Building Power-Efficient, Context-Aware Mobile Systems," February 2014, RTC Magazine, pages 28-31.

BACKGROUND OF THE INVENTION

Billions of parcels of parcels are shipped by train, truck, ship, and air each year. Boxes, bags, and containers in thousands of variations that have been in use for many years for protecting the parcels during transit from point of origin to intermediate transfer points and a final destination. They are continually enhanced to provide for secure parcel delivery; offering additional protection from pilferers and thieves as well damage from rodents, water ingress, and the like. Since the terrorist attacks on Sep. 11, 2001, there has been emphasis on preventing parcels from malicious tampering by persons who would intentionally introduce explosives and other dangerous substances into a parcel during transit. Inspection equipment such as Geiger counters, x-ray machines, and electromagnetic wave generators have been utilized to detect such malicious tampering.

The present invention is in the technical field of mathematical forensics. Since the early 20th century, fingerprint detection and analysis has most likely been one of the most common and important forms of forensic investigation. More crimes have probably been solved with fingerprint evidence than for any other reason. Image identification is the process of comparing two instances of recorded digital data of the edges of coloration in photographic impressions.

More particularly, the present invention is in the technical field of protecting parcels from tampering during shipment and storage by processing digital imagery data of patterns formed by surrounding a parcel with media made according to the present invention.

The invention also relates to a system for creating unique exemplar image data for a computer-implemented method. In a best embodiment, the exemplar image data is encrypted and assigned to an identifier that comprises a public key. When a subsequent second image data is produced, a computer algorithm retrieves the exemplar image data and compares the data versus subsequent second image data and provides a measure of the likelihood of tamper.

DISCUSSION OF PRIOR ART

Prior art involve, but are not limited to, physical security using locked metal containers, tension wrapping with plastic and taking weight measurements at locations of transfer and inspection. At locations enroute, some of the common inspection techniques involve scanning with ultrasound, x-ray, millimeter radar, and electromagnetic waves. In other methods, swabs are taken which are tested in chemical spectroscopy machines. These means are expensive and offer only point-inspection. A means is needed to provide less expensive, yet effective, detection during the entire shipment.

Other prior-art rely on diverse protection from tamper by using breakable devices such as adhesive strips, mechanical locks, radio frequency identification (RFID) tags which communicate to a computer network and RFID tag readers, or metal threads. These methods are expensive to implement and not sufficiently comprehensive to assure detection.

For example, in U.S. Pat. No. 8,294,577, Deak presents using stressed magnetoresistive tamper detection devices mounted with respect to a protected structure so as to have corresponding stress changes occur therein in response to selected kinds of tamperings.

In another example, U.S. Pat. No. 8,388,025 to Mrocki et al presents a strip for tamper evidencing that has a first layer and one or more reinforcing layers. An adhesive selectively adheres the first portion of the strip such that removal or attempted removal of the first portion of the strip from the second portion of the strip will be evidenced by the first layer.

U.S. Pat. No. 8,031,069 to Cohn, et al describes a tamper-proof electronic security seal, which includes a bolt, a locking element, and an electronic seal element. In response to a severing of the shank with the sensor inserted therein, the control unit is operative to activate the communications means to emit an alarm signal.

U.S. Pat. No. 8,274,389 to Teeter teaches a disposable and tamper-resistant radio frequency identification (RFID) lock that employs an RFID tag, use of tamper-evident housing, and disabling an RFID tag contained in the housing cutting, crushing, or puncturing the RFID tag.

All these wonderful techniques are costly and currently humans visually inspect for damage or tampering of small mail and parcels. In part, this is due to the fact that the transportation supply chain is complex and complicated.

Perhaps the most relevant prior art is related to automated forensic fingerprint authentication systems used to permit entry into a secured area. There are different types of fingerprint readers on the market, but the basic idea behind each is to measure the physical difference between ridges and valleys of the current print against other prints on file.

BRIEF SUMMARY OF THE INVENTION

The nature of this invention is a system, either fixed or portable, for detecting tamper of parcels such as, without limitation, a bag, a carton, an envelope, a tube, a shipping container, and a pallet, by using digital image analyses to uniquely identify the untampered state of parcels and performing further identification enroute to destination. Currently, humans visually inspect for damage or evidence of tampering. The process of the current invention uses a similar digital approach, wherein the Bayesian inverse modeling algorithm models the distance between the features of the birth certificate image and the features of the current image at a resolution high enough to determine tamper. Bayesian methods are well established and a list of publically available references is included herein and is included by this reference in their entirety.

Significant advances by manufacturers are driving down processor and sensor costs and size. This availability of wide-range of low-cost, small-footprint sensors such as, but not limited to, dopant-filled granules, fragments of fluorescent media, provides the ability to protect goods in transit with exciting new context-aware applications in a mobile embedded system that is either self-contained or linked to the internet "cloud." Today's sensor-based context-aware subsystems mimic in many aspects how humans analyze situational content. For example, precision image sensors are commercially available that capture digital images with pixels having consistent resolution and fidelity as environmental conditions change. The current patent anticipated these advancements and teaches an embedded system or permanently installed system utilizing these sensors to measure integrity and safety risk of goods in storage and transit by effective use of sensor data and optimized decision-making that integrate and analyze data quickly and process into usable tamper information.

According to J. Wrigley in "Building Power-Efficient, Context-Aware Mobile Systems," (cited in the list of Non Patent Documents), a mobile embedded system can use the core application processor to capture and manage the sensor data and execute algorithms. For embodiment of the current patent, the sensor data are package images and the algorithms include tamper algorithms. Or, a mobile embedded system can offload the sensor data to another computer for execution of a tamper algorithm.

The approach taught in the current patent is particularly attractive in context-aware tamper detection applications, which, by definition, must be prompt; collecting information from multiple sensors in parallel and in real time with devices available today that consume less than one miliwatt while collecting data from each sensor at near-zero latency for a more accurate tamper response.

Most persons have seen the bright colors caused when rocks containing fluorescent particles are exposed to stimulating rays of ultraviolet (UV) "black light" lamps, perhaps in an amusement park or in a natural science exhibit, while in ordinary light, the rocks are a quite different color. The present invention uses recognition of the patterns caused by spectral emissions from responsive media at a controlled wavelength in a media deposed conformally encapsulating an object or the packaging material of the object for storage or shipment. The flexibility of the sensitized media forms a skin-like wrapper surrounding a parcel destined for shipment. This flexibility during application results in two patterns never being exactly alike in every detail. In fact, over time, even two digital images recorded after each other from the same wrapper will be slightly different.

The current patent teaches an automated image identification process that determines whether the exemplar "birth certificate" digital recording of coloration of a parcel made, encapsulated according to the current patent, is sufficiently comparable to the image data of the same protected parcel taken at a subsequent time.

Automated fingerprint methods can be grouped into two major categories: solid-state fingerprint readers and optical non-contact or touchless 3D scanners that acquire detailed 3D information. The latter category aligns to the present invention. 3D scanners take a digital approach to the analog process of pressing or rolling the finger. By modeling the distance between neighboring points, the fingerprint can be imaged at a resolution high enough to record all the necessary detail. The present invention is also based on a touchless approach by modeling the distance between neighboring points at a resolution high enough to record all the necessary detail.

The current patent teaches parcel tamper identification, which, like an automated finger print identification system, involves an expert computer algorithm for comparing images operating under threshold scoring rules, determining whether a digital data of induced color impression is likely originated from the data of the induced color impression of same wrapper when first applied.

The present invention describes a system and methods for enabling secure parcel delivery by encapsulation within conformally deposed bags or sheets that are constructed with entrained or externally deposed with artifacts doped with chemicals that respond to light waves of a particular range of wavelength. In a low-cost embodiment, swirls of aniline food-grade fluorescing dye added during manufacturing of polymer film would provide the adequate response to stimulating rays. Another alternative to creating the sensitized media is to embed microcapsules filled with fluorescent materials within.

Creating an image that is sufficiently unique to detect tamper using the technique of the present invention is not difficult because the factors causing uniqueness include, without limitation, disposition pressure, thermal sensitivity of the media, pliability of the media, types of dopants, size and types of residues, randomness of the residues, and use of identifier symbols. Other important factors contributing to uniqueness are the starting point for application of the media and the friction coefficient of the surface to which it is applied. These are just some of the various factors that can cause an embodiment to appear differently from any known recording of the same media on the same edges. Indeed, the conditions surrounding every instance of deposition are unique and never duplicated.

A digital recording of induced fluorescent coloration in stimulating rays, which, without limitation, includes ultraviolet light, will have additional edges than a recording made in ordinary light because of the changes induced by the stimulating rays.

The induced fluorescence could be produced, without limitation, by an ink with encapsulated particles that fluoresce, or a combination of fluorescent inks, fragments, filaments, and symbols on an opaque background or in a translucent media. If the media is transparent, as often is the case with polymers, the fluorescent artifacts can be within or under the media. The coloration of the artifacts in normal light form a "patent print" or "plastic print" that is viewable with the un-aided eye, as well as a "latent print" invisible to the naked eye until exposed to a certain wavelength of stimulating rays, such as a certain wavelength of ultraviolet light.

The current patent teaches the use of known digitally recorded exemplars deliberately taken at the time of packaging as the baseline digital data. Said exemplar image data will include several individual images of data collected at several different spatial locations so that the portions of the images collected overlap and span all surfaces.

The operation of the invention is: 1) digitally recording spectral images of the initial exemplar image data taken from a plethora of perspective views that span the surface of the volume, 2) storing the exemplar image data with an identifier; and 3) performing a statistical comparison of differences between the current image data versus the birth certificate data and making a determination of the cause of the difference, which, if slight, could be typical. If the difference is significant, it could have resulted from load stress or other natural causes as well as intentional tamper. In the case of parcels in transit, the comparison would be made at waypoints enroute.

BRIEF DESCRIPTION OF THE DRAWINGS

Various embodiments of the invention are disclosed in the following detailed description and accompanying drawings.

REFERENCE TO NUMERALS USED IN DRAWINGS

Figure 1:
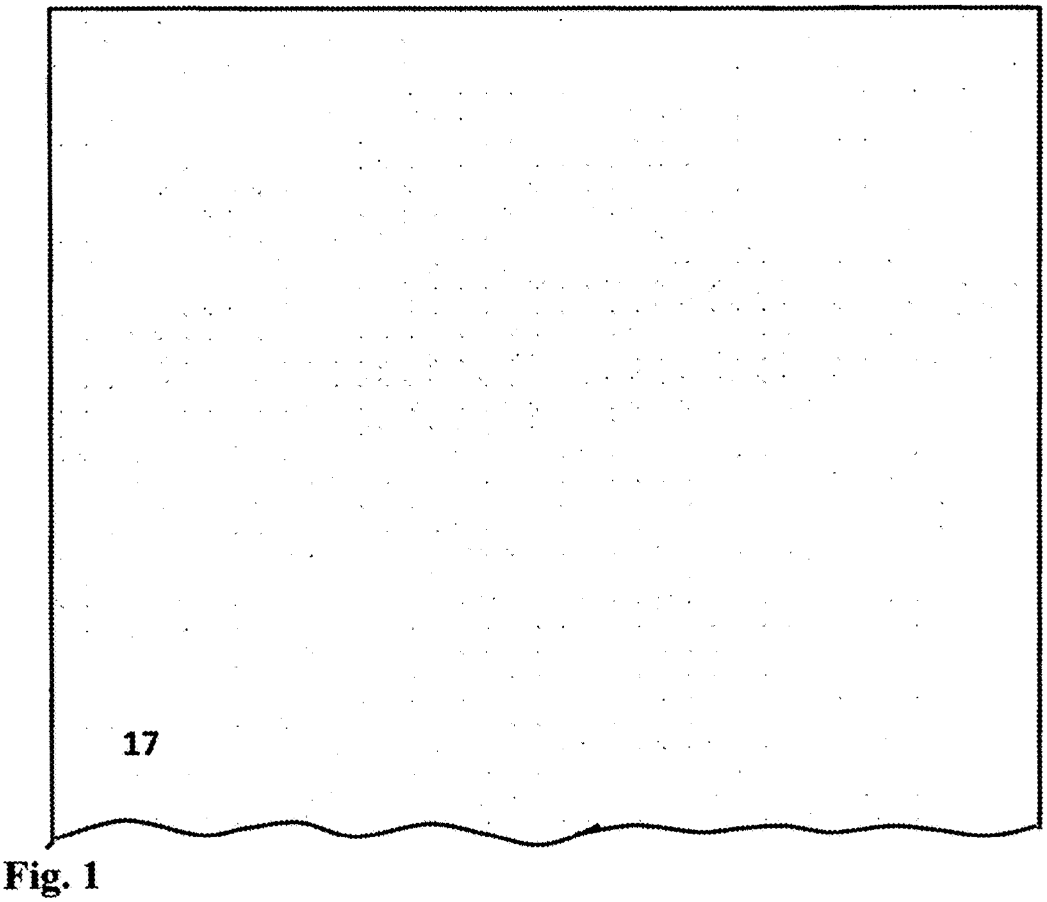
FIG. 1 is a diagram representing a pliable film of polymer sheet with scattered light reflections.

Parcel 1
Identifier 2
Container 3
Heated Air 4
Cooled Air 5
Light Source 6
Precision Imaging Sensors 7
Transparent Surface 8
Thermal Station 9
Cooling Station 10
Image Station 11
Conveyor 12
Cloud Processor 13
Imaging Controller 14
Computer with Display 15
Stimulating Rays 213
Image 16
Substrate 17
Undoped 18
Red 19
Green 20
Yellow 21
Marker 22
Envelope 23
Box 24
Container 25
Tube 26
Advance Parcel 27
Obtain Parcel ID 28

Current Pixel Data 29
Parcel Image Database 30
Retrieve Initial Pixel Data 31
Registration 32
Test Algorithm 33
Output Tamper Signal 34
Output to Message Display 35
Record Test Results 36
Embedded Device 37
Tamper 38

DESCRIPTION OF TERMS

The principles of digitized spectral (photograph) images are well known. Each image is comprised of a matrix of m×n cells called pixels. Each pixel has a numerical value that represents the darkness of the point in the image the pixel represents and, additionally, a color.

The theory and principles of producing fluorescent materials includes doping media with dopants that produce light at a second wavelength when illuminated by light of a first wavelength.

The terms "residue" and "artifact" used herein refers to particles, strips, strands, fragments and dyes that are employed to produce the digital image data produced by the present invention.

The term, "image registration," refers to orienting the image by finding edges or centroid markers or other identifiers.

A "Cloud Environment" is a term used to describe a network of associated computers that perform services as needed, when needed.

A "Cloud Processor" is a computer of any type.

RFID tags are devices widely used in tracking the whereabouts of valuable goods shipped by air, sea and ground. In reducing this patent to practice, a commercially available active RFID tag with an embedded processor and battery was used to record and process information as well as communicate wirelessly to a cloud environment. A global positioning system (GPS) tracking device is often included to provide precise information about time and location. The Mar. 14, 2014 USA Today newspaper reported that the 2014 Travel Goods Association show in Phoenix exhibited GPS tracking devices that track everything from wallets to checked bags. Active RFID tags with GPS are widely used in tracking commercial shipment of parcels. The embedded processors get their power from small batteries or solar energy, or kinetic energy.

Bayesian Exemplar Recognition algorithms detect changes (anomalies) by performing differential analyses. In the current patent, the data of the "as packaged" image is subtracted from the data in an image taken at the waypoint or destination. Cuts, tears, and holes will cause significant differences. The significant differences are flagged for further analyses and alerts.

DETAILED DESCRIPTION OF THE DRAWINGS

The following is a detailed description of exemplary embodiments to illustrate the principles of the invention. The embodiments are provided to illustrate aspects of the invention, but the invention is not limited to any embodiment. The scope of the invention encompasses numerous alternatives, modifications and equivalent; it is limited only by the claims.

Numerous specific details are set forth in the following description in order to provide a thorough understanding of the invention. However, the invention may be practiced according to the claims without some or all of these specific details. For the purpose of clarity, technical material that is known in the technical fields related to the invention has not been described in detail so that the invention is not unnecessarily obscured.

Referring now to FIG. 1, which diagrammatically represents a substrate 17 of packaging material suitable for imprinting, embossing, or other means to add multispectral materials to form a fingerprint. The construction could be, without limitation, paper, metal, or polymer such as polypropylene, polyvinyl, or polyester. The material forming the image when exposed to light can be elected from doped substances and combinations, such as paint, strips, strands, filaments, and fragments.

Referring again to FIG. 1, a person familiar with preparing goods for shipment would appreciate the substrate 17 could conformally surround a package or could be a part of the construction of a container. Further, the film could be part of the manufacturing process for the package or container.

Figure 2:
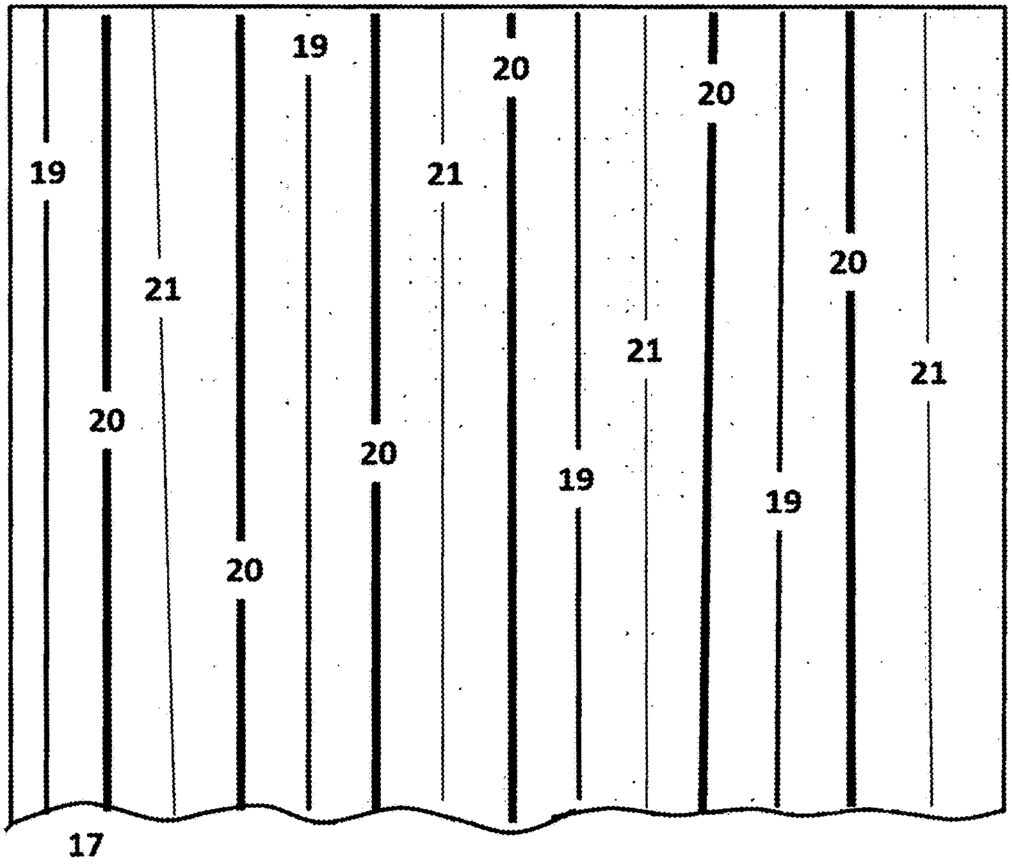
FIG. 2 is a diagram diagramming a portion of pliable polymer, with multiple vertical doped filaments.

Referring now to FIG. 2, which depicts a substrate 17 of suitable material with vertical lines representing substances doped for red 19, green 20 and yellow 21 response to ultraviolet light.

Referring again to FIG. 2, a person familiar with wrapping parcels would appreciate that the initial pattern of doped filaments could be any shape. Further, the substances can be doped to be multi-spectral to provide rainbow-type coloration.

Figure 3:
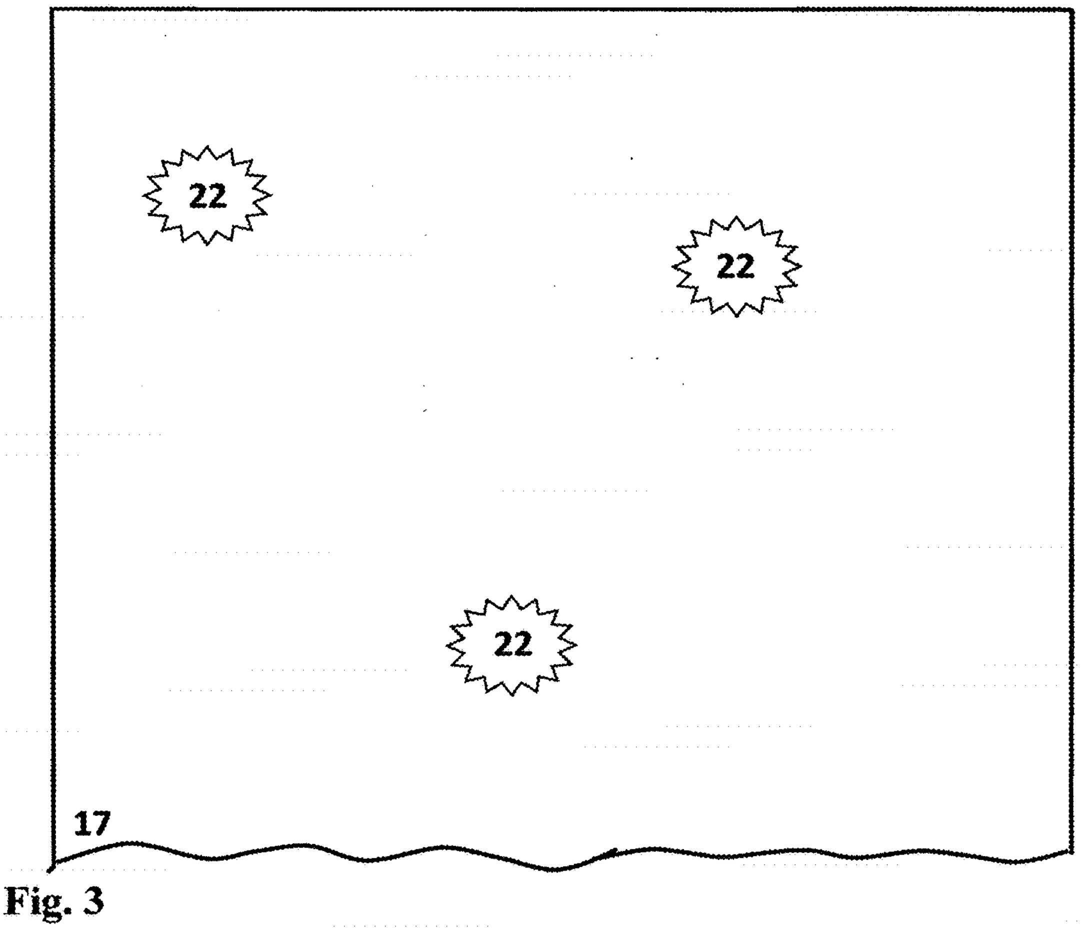
FIG. 3 is a diagram drawn with targets added to provide orientation markers that help to speed up aligning the data at initiation of a tamper algorithm.

Referring now to FIG. 3, which is a diagram of a substrate 17 with three markers 22, which could be, without limitation, embossed, glued, or integral, with purpose to provide orientation marks to speed the fingerprint analysis. In an ideal embodiment, the markers 22 would have diverse doping responsive to ultraviolet light. Without limitation, the markers 22 could be of any shape or coloration and can be configured for a special purpose, such as a warning, indication, or classification.

Referring again to FIG. 3, a person familiar with preparing packages for shipping would appreciate that the substrate 17 could be transparent or opaque, and in addition to markers 22 additionally could be, without limitation, imprinted, embossed, or otherwise labeled with symbols and letters. A person familiar with the art of wrapping packages would appreciate that the substrate 17 could be transparent or opaque. A person with ordinary experience in the art would appreciate that in addition to markers 22, media used to produce the substrate can be selected to respond to exposure to stimulating rays from a variety of commercially available media suitable for the purpose. In addition, said person would understand there are many ways that the substrate 17 can be conformally wrapped, such as, but not limited to, tension, heat shrink, and using a glue to adhere to the surfaces of the parcel.

Figure 4:
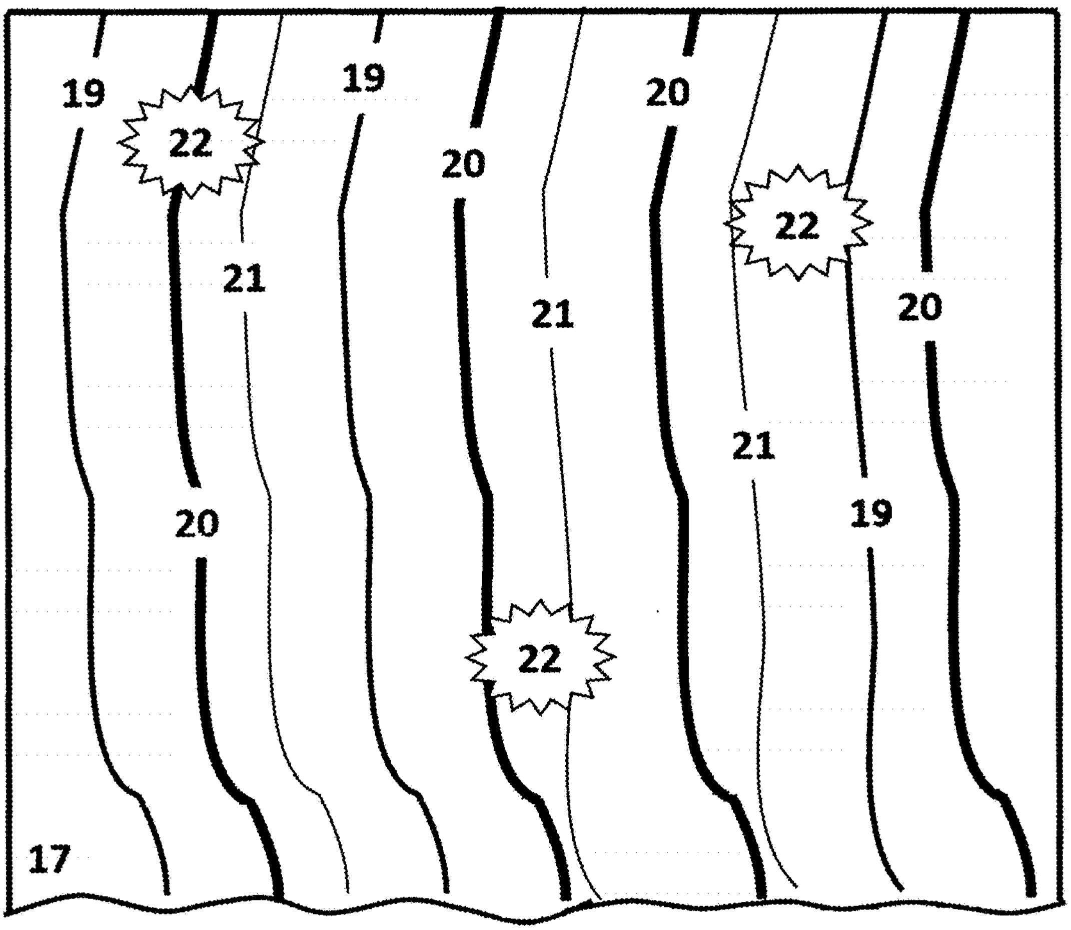
FIG. 4 is a diagram of a portion of substrate film with doped filaments and markers and after tension wrapping or heat shrinking polymer bags or polymer wrapping material.

Referring now to FIG. 4, which is a diagram of a portion of substrate 17 after application with markers 22 and sensitized strands forming a pattern after heat shrink, that include undoped 18, doped to emit bright red 19, doped to emit bright green 20, and doped to emit bright yellow 21. The filaments are shown distorted, which could be caused by stretching during stress wrapping or heat shrinking. The lines per the method prescribed for patents are grey, but would be of diverse colors caused by the doping in response to a stimulus, such as ultraviolet rays. Note: Patent application regulations require avoiding use of colors; thus the variation in darkness of the lines in the diagram attempt to represent actual colors induced by stimulating rays.

Referring again to FIG. 4, in an exemplary embodiment showing that the sensitized strands could individually be doped with a mixture of dopants that produce a multi-spectral response when stimulated.

Figure 5:
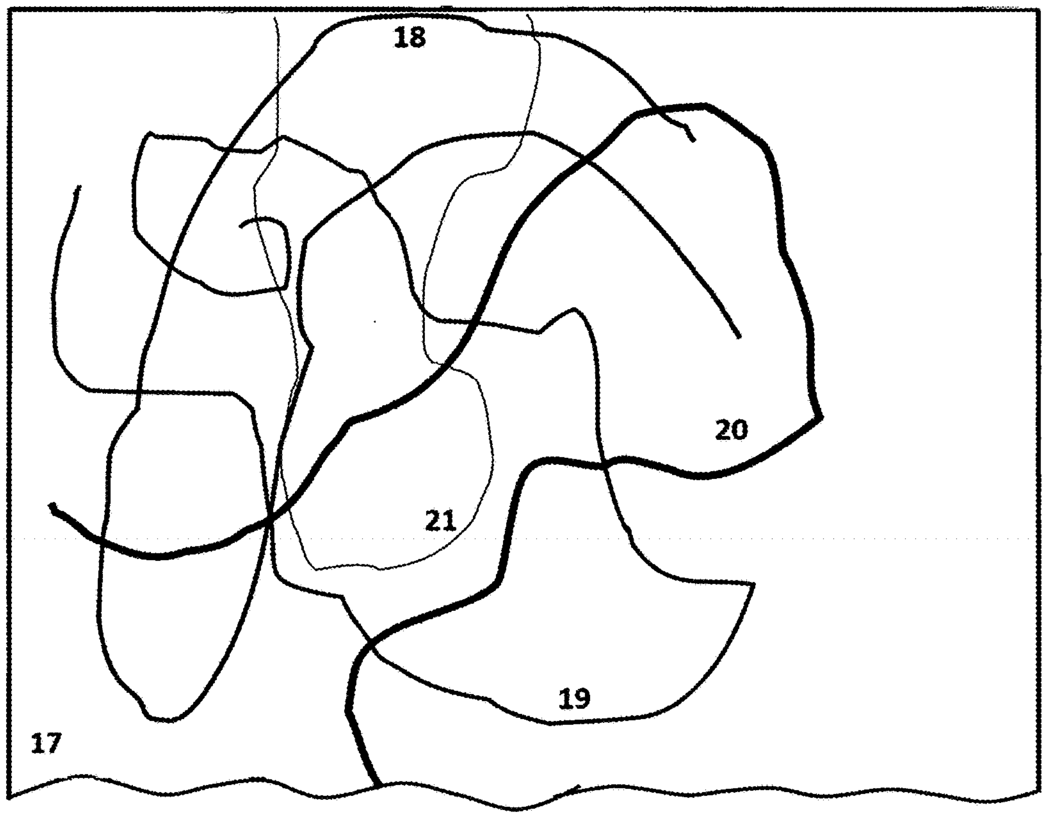
FIG. 5 is a diagram depicting swirls of sensitized fibers observed in ordinary light.

Referring now to FIG. 5, which shows diagrammatically how sensitized media can be undoped 18, doped to emit bright red 19, doped to emit bright green 20, and doped to emit bright yellow 21 in response to stimulating irradiation, but appear to have another color in ordinary light. The variation in darkness of the grey of the drawing attempt to represent actual colors induced by stimulating rays.

Referring again to FIG. 5, the art of preparing goods for shipment is well known. A person with ordinary familiarity with the art of packaging would appreciate that the doped media that creates an image when exposed to stimulating rays could be incorporated during manufacturing of the substrate 17 as well as before, during, or after surrounding the package. Examples include, but are not limited to, adding the doped media to the substrate 17 with a flocking gun or pressurized sprayer that mixes the doped media into a carrier substance before it is applied.

Figure 6:
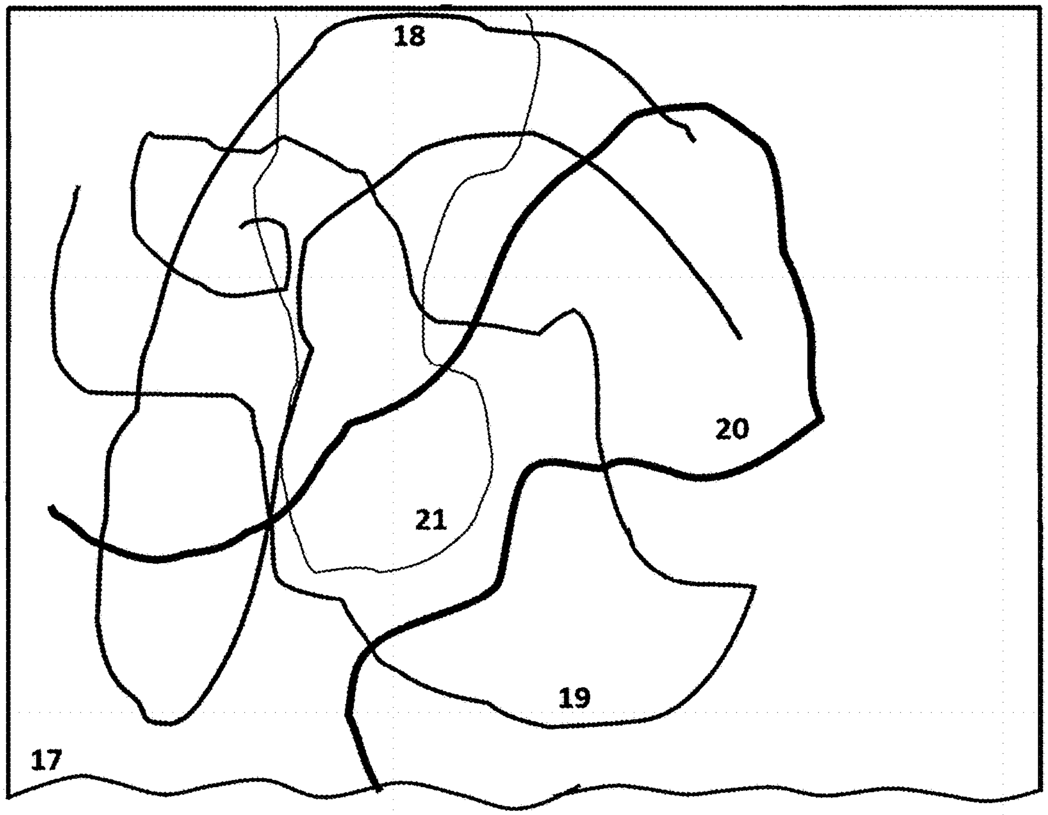
FIG. 6 is a diagram of swirls of doped fibers responding in UV light.

Referring now to FIG. 6, which shows diagrammatically how a substrate 17 can be produced with doped filaments and fragments, that is undoped 18, doped to emit bright red 19, doped to emit bright green 20, and doped to emit bright yellow 21 colors forming a unique digital image response to stimulus radiation. The digital image is altered when the substrate is cut or broken as the doped strips or filaments will be stressed causing them to deform, break, and alter the image. Duplication of any piece of the security packaging will be virtually impossible due to the multi-spectral nature of the signatures. The media can additionally be doped with chemicals that fluoresce in the presence of gas species emitted by explosive or other hazardous materials. The media can also be doped with rare earths that scintillate when exposed to radioactive material.

Referring again to FIG. 6, the art of fluorescent chemistry with dopants is widely known. The choice of dopant is selected for fluorescing in yellow, red, green or other color when exposed to stimulus rays such as ultraviolet rays. A unique fingerprint pattern will be produced by adding dye during extrusion of sheets of plastic. For plastic or natural fibers, the dye could be infused at manufacture or added at the point of shipment. Thermally shrinkable, polymer films are offered by several corporations. Markers can be produced by printers.

There are options to creating a unique pattern. As one of many possible examples, the sensitized filaments and markers can be laid onto or into the substrate 17 to create bags, sheets, or tubes to surround packages as well as containers for packages. For example, cardboard shipping boxes can have the doped sensitized media added to the outer surfaces. An additional outer soft or hard transparent layer can be used for extra strength.

A person familiar with preparing goods for shipment would appreciate that the technique of the current invention is scalable from small packages to large rail and sea cargo containers.

Figure 7:
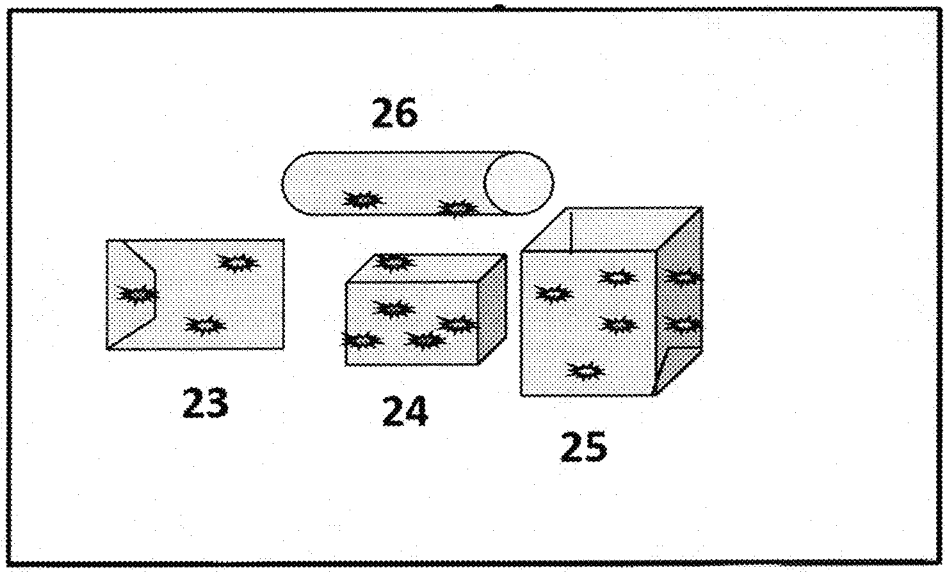
FIG. 7 depicts a variety of packages manufactured in accord with the teachings of the current patent.

Referring now to FIG. 7, which shows example packages that can be constructed in accord with the current patent. Depicted are an envelope 23, a box 24, a container 25, and a tube 26.

Referring again to FIG. 7, a person familiar with preparing goods for shipment would appreciate that adding an outer layer of tough, waterproof, translucent material that permits verification of the fingerprint could be an advantage.

Figure 8:
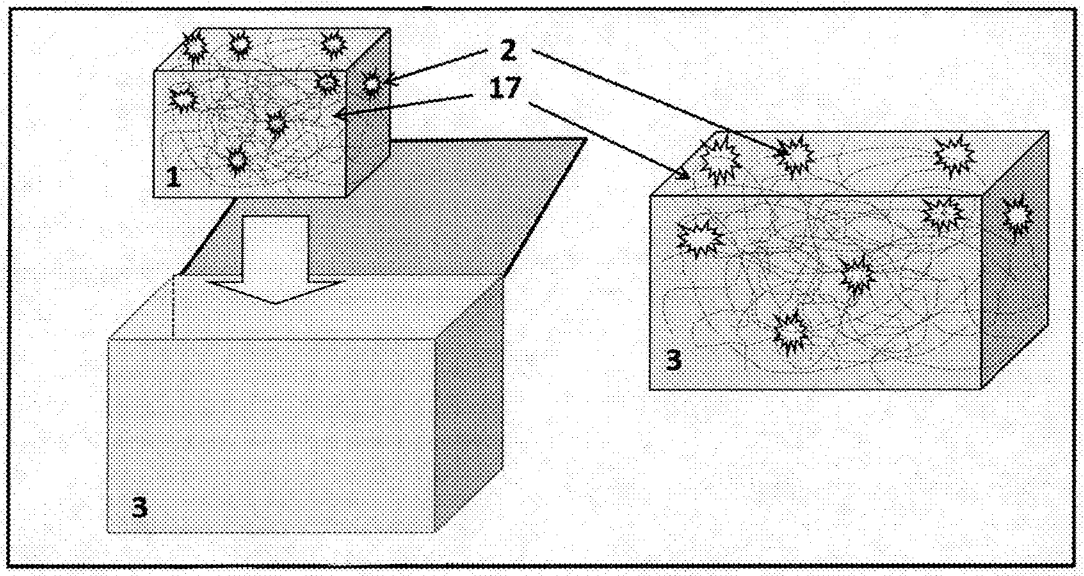
FIG. 8 depicts an item that is inserted into stock packaging made with sensitized media to produce a digital image made in accord with teachings of the current patent.

Referring now to FIG. 8, which shows a perspective view of a parcel 1 prepared in accord with the current patent and then placed in an outer container 3. The parcel 1 is proximally surrounded with a substrate with doped media constructed in the manner taught in the present invention. Identifiers 2, which provide identification and targets for orientation, are optional.

Figure 9:
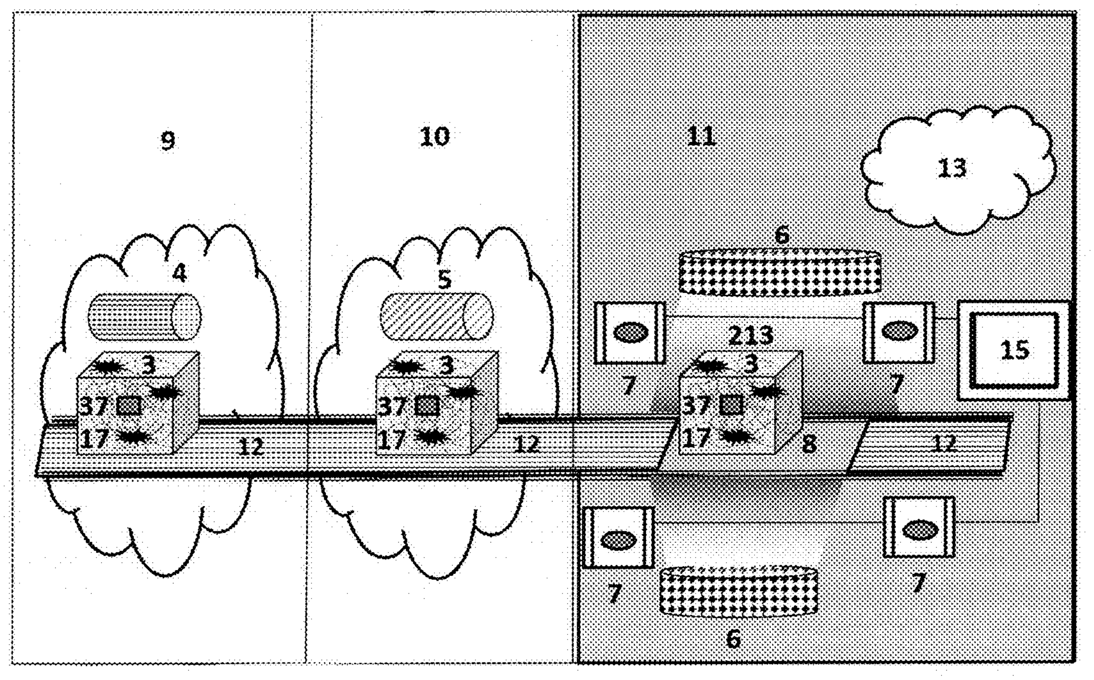
FIG. 9 is a perspective drawing of an exemplary process for packaging a parcel and obtaining birth image data in an automated procedure.

Referring again to FIG. 8, a person familiar with the art of preparing goods for storage or shipment will appreciate that there are many types of packaging material and many types of containers suitable for use with the present invention Referring now to FIG. 9, a container 3, created according to the teaching of the current patent with an embedded device 37 attached on the surface before encapsulation in accord with the current patent. The container 3 is placed on a conveyor 12, which moves the container 3 to a thermal station 9 for a sufficient time where heated air 4 thermally shrinks the surrounding sensitized substrate 17. The container 3 is hence routed to a cooling station 10 for a sufficient time for cooled air 5 to set the polymer before movement to a darkened image station 11 lit by light sources 6 emitting stimulating rays 213, which effect an induced response from the artifacts in the polymer. At the image station 11, an imaging device commands precision imaging sensors 7 that record the induced image data of a container's 3 surfaces from encompassing perspectives. The imaging device prepares a birth image data comprising at least an identifier and the recorded induced image data, and then communicates the birth image data to the embedded device 37 and to a cloud processor 13 for storage in a database. On the right side of FIG. 9 is a display 15 for monitoring the activity.

Referring again to FIG. 9, a person with ordinary understanding of the art of shipping goods in packages would appreciate that if the substrate is glued or applied with tension, the steps of heat shrinking and cooling are not needed. In addition, said person would appreciate the cloud processor 13 can be located anywhere; so long as it is connected by wire or wireless device to a communication network that, in turn, connects it to communication equipment at the point of origin and transfer destinations enroute to the final destination. Further, said person would appreciate that the embedded device 37 is redundant because a cloud processor 13 will accomplish the same functions.

Referring yet again to FIG. 9, a person familiar with databases for storing digital images used in monitoring shipment of goods would appreciate that public and private passwords are but one method to protect digital data.

Figure 10:
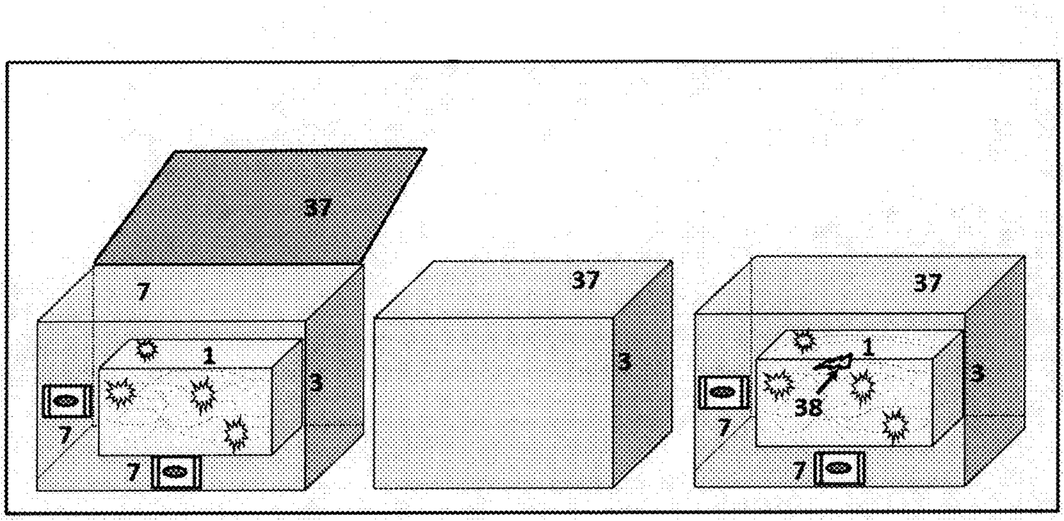
FIG. 10 depicts a package with an embedded tamper protection system.

Referring now to FIG. 10, which is a perspective drawing of a container 3 configured with an integral embedded tamper protection system constructed in accord with the current patent. Before shipping, an embedded device 37 with Bluetooth™ or other wireless means is operatively mounted on, or within, the container 3 to precision imaging sensors 7. On the left is a container 3 with an embedded device 37 and a parcel 1 during preparation. In the center is a container 3 ready to ship. On the right is a container 3 with a parcel 1 with a tamper 38. After the container 3 is closed, the embedded device 37 commands precision imaging sensors 7 to collect digital birth image data of parcel 1. During a shipment, according to programming, for example, but not limited to, on a schedule, on a command from an inspection device, or when the container is opened, the embedded device 37 will collect a second digital image data of parcel 1 and perform a tamper algorithm and communicates the tamper algorithm result. If the imaging sensors are positioned to additionally focus on the opening at the lid, an image of the person opening the container 3 can be recorded and additionally transmitted. If programmed to do so, the embedded device 37 can also communicate the tamper algorithm result and additionally the images to a cloud processor 13.

Referring again to FIG. 10, a person with ordinary understanding would appreciate that the container 3 can be configured with integral tamper protection system by mounting the embedded device 37, and the precision imaging sensors 7 with integral light source within.

Figure 11:
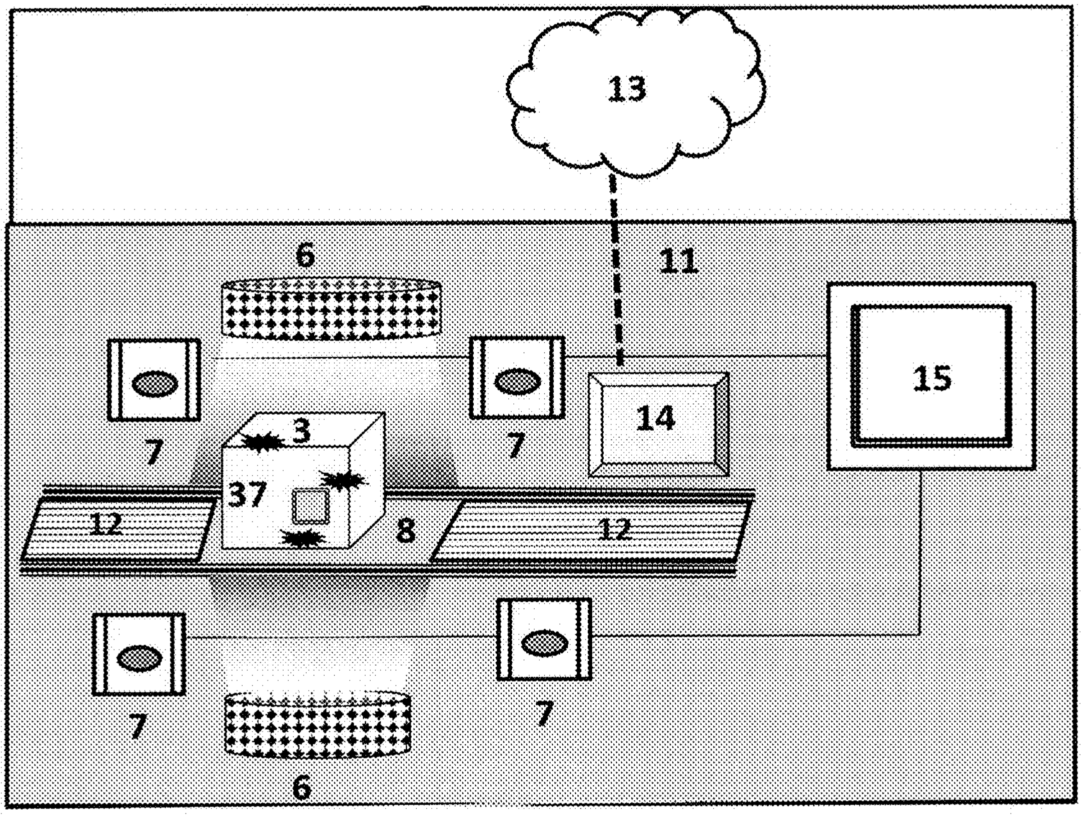
FIG. 11 is a perspective drawing of an exemplary process for tamper detection at a destination point.

Referring now to FIG. 11, which is a perspective drawing of a darkened image station 11 illuminated by stimulating light sources 6 wherein the container 3 is placed on a conveyor 12, which moves the container 3 to a transparent surface 8. An imaging controller 14 uses one or more precision imaging sensors 7 to record current image data. If the container 3 has included an embedded device 37, the imaging controller 14 obtains the birth data from the embedded device 37, performs a tamper detection algorithm, and outputs the results to a display 15. If the container 3 is not equipped with an embedded device 37, the imaging controller 14 can be programmed to transmit the current image data to a cloud processor 13, which sends the birth image data to the imaging controller 14, which performs a tamper detection algorithm and displays results on display 15.

Figure 12:
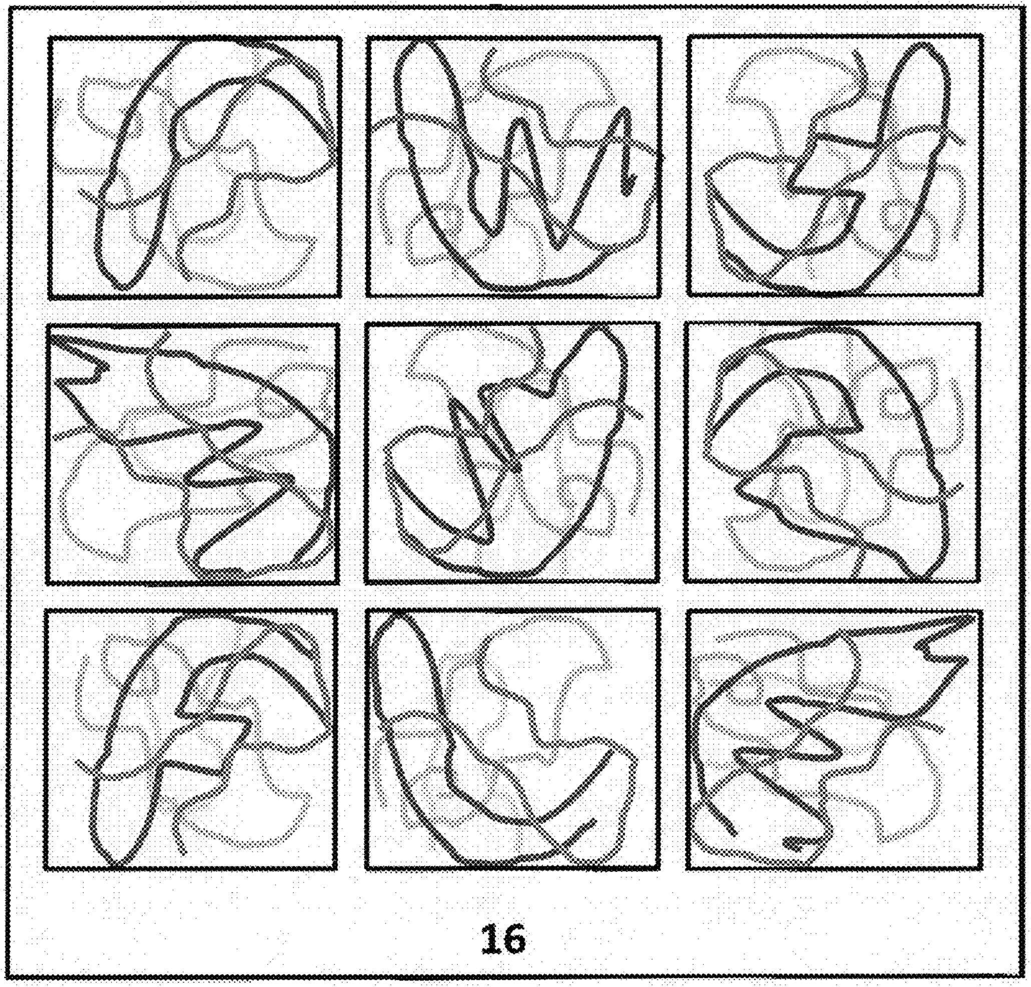
FIG. 12 depicts a set of nine images taken from nine perspectives.

Referring now to FIG. 12, which depict images 16 take from surfaces of a package protected in accord with the teaching of the current patent. Protecting security of digital information is widely taught. In high security situations, the digital representations are encrypted before transmitting the information to a secure cloud computer as reference to determine tamper during transit.

Figure 13:
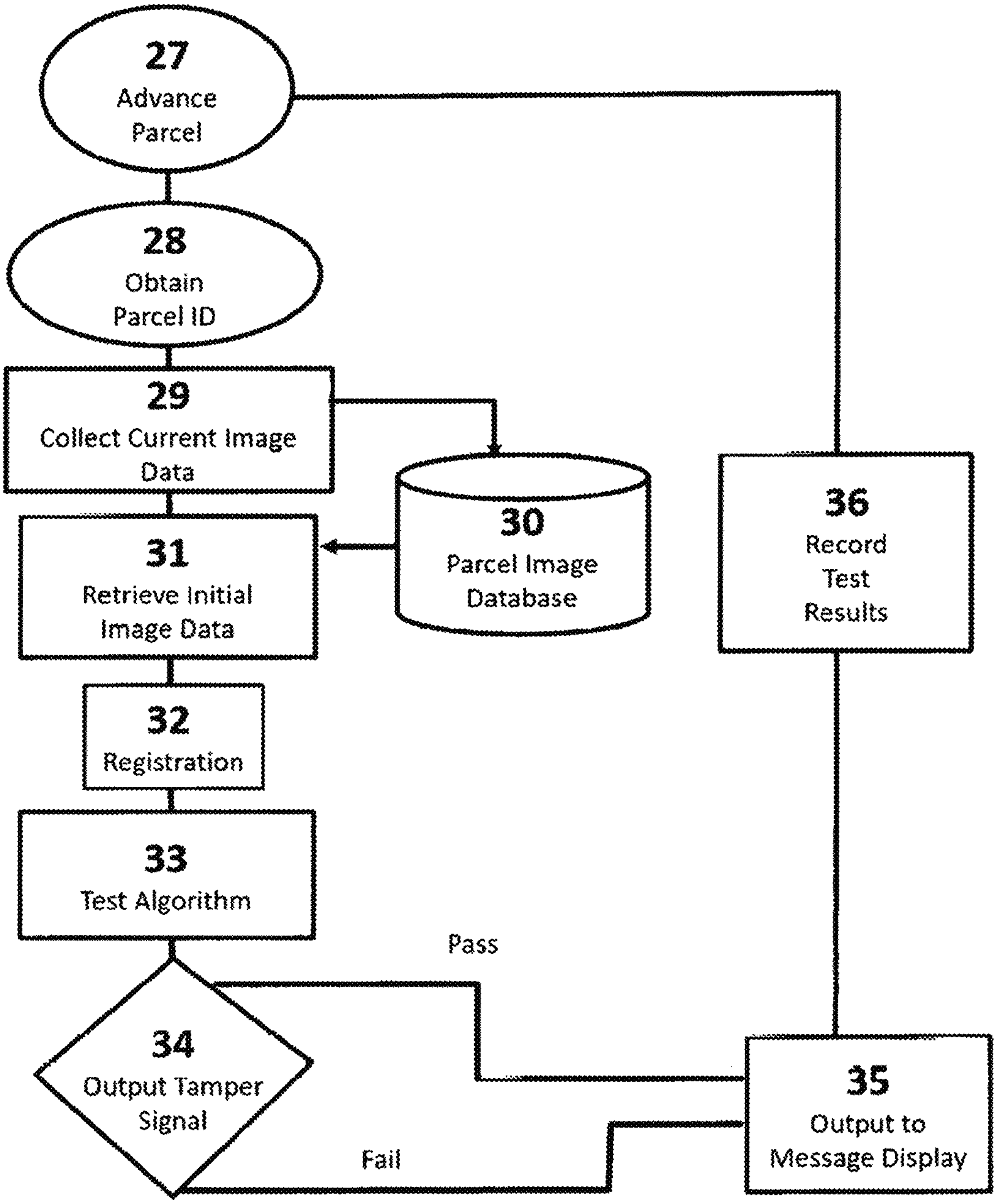
FIG. 13 is a flow diagram of operation of the tamper decision process.

Referring now to FIG. 13, which is an exemplary flow diagram of the tamper decision process. Select next parcel 27, then collect the parcel identifier 28 and current pixel data 29. Use the parcel image database 30 to retrieve the initial pixel data 31 from the parcel database 30, and perform registration 32 by locating registration points in the current image database that correlate with registration points in the initial image data. Next, test for evidence of tamper with Bayesian test algorithm 33. If the test result is "pass," then tamper result is "pass;" else tamper result is "fail." Output tamper result 34 for display 35, record test results 36 and advance next parcel 27.

Referring again to FIG. 13, a person with ordinary familiarity with the art of shipping goods would understand that the parcel identifier could be a number, or a combination of numbers and text, a barcode associated with a number, or other means.

DETAILED DESCRIPTION OF THE INVENTION

The following is a detailed description describing exemplary embodiments to illustrate the principles of the invention. The embodiments are provided to illustrate aspects of the invention, but the invention is not limited to any embodiment. The scope of the invention encompasses numerous alternatives, modifications and equivalent; it is limited only by the claims.

Numerous specific details are set forth in the figures and description are provided in order to provide a thorough understanding of the invention and how to practice the invention. However, the invention may be practiced according to the claims without some or all of these specific details. For the purpose of clarity, technical material that is known in the technical fields related to the invention has not been described in detail so that the invention is not unnecessarily obscured. References are cited that provide detailed information about electrical systems, unsafe conditions of electrical systems, and approved techniques for implementing protection systems.

Several approaches are described herein and they may be used together or independently. In alternatives, certain aspects of each approach or combination may be omitted.

In a first approach, the apparatus for automatically authenticating the parcel and algorithm means to trust that the parcel is un-tampered and is safe. Alternatively, the apparatus can add additional levels of trust at each waypoint.

In a second approach, a method is presented for validating the integrity of the shipped object during transit. The method attempts to detect tampering of the parcel by any violation of the integrity of the parcel encapsulation.

In a third approach, an automated method is presented for validating the integrity of a shipped object at waypoints during transit. The method attempts to detect tampering of the parcel by any violation of the integrity of the parcel encapsulation.

In one alternative, data relating to the parcel is securely identified on the encapsulation and can be accessed and validated at checkpoints along the delivery path. For example, each agent in the shipping path may obtain parcel data and verify the parcel is untampered. In another alternative, each agent adds to a list of related data records as the validated parcel travels from agent to agent along the route.

The current patent is a system for determining that a parcel is tampered. The system comprises wrapping, encapsulating or enclosing the parcel with media emitting a unique signature when exposed to certain stimulating photons, such as ultraviolet light. A processor is configured to record a data comprising a parcel identifier and digitized birth image data obtained by using a camera or other imaging device when said parcel is exposed to stimulating photons.

Data relating to the parcel comprises the identifier, digitized image, size, weight, and density of the parcel. Parcel measurement systems are known and not described in detail herein. In an alternative approach, a response signature from a second or third UV spectrum related to the parcel is stored as related parcel data. For example, the parcel response to a 400-ångström UV source is stored. A similar source may then be used at the destination or along the path to verify that the same signature securely stored with the parcel is received. Other UV spectra may be utilized, including but not limited to 300 ångströms and 500 ångströms.

The response signature is collected by simultaneous cameras that provide optical non-contact or touchless detailed digitized 3D optical information at a resolution high enough to record all the necessary detail.

Once collected, the identifier data and birth image data is communicated to an attached embedded processor, if any, and a cloud computer wherein the parcel birth data is stored encrypted with a public key.

A person with ordinary skill in data security techniques would appreciate that techniques such as replication, authentication, non-repudiation, and secure transmission are well known, as are methods for computerized pattern identification in digital images and probabilistic risk assessment.

At a shipping station, an optical reader may be used to read parcel identification fields or other data on a parcel. A scale with digital output can be used for providing automated weight information. A parcel computer record is created including, but not limited to, a parcel identifier (ID), time and date, and shipper information (such as name, origin, account number, address, and parcel destination information).

As the parcel moves from the origin through transfer points to a final destination, it is inspected for tamper using a system comparable to or compatible with the system that created the birth certificate data. The system enroute to the destination scans or otherwise obtains the identifier, produces a current image data of the parcel. The enroute system communicates the identifier to the attached embedded processor, if any, or a cloud processor, which retrieves the parcel birth certificate data, decrypts the data, executes a tamper processing step—comparing the birth certificate data with the current parcel data, stores the result of the tamper processing step, and sends the result of the tamper processing step with public key to one or more recipient addresses for awareness of the integrity of the parcel.

An advantage of including a cloud computer in the architecture is that if the embedded processor is confounded for some reason, the tamper determination can be accomplished by another processor configured to perform the tamper processing step after obtaining a copy of the package birth certificate data from a trusted replicated database.

In broad embodiment, the present invention describes illustrative embodiments of a system and method for parcel shipment including tamper detection. The embodiments are illustrative and not intended to present an exhaustive list of possible configurations. Where alternative elements are described, they are understood to fully describe alternative embodiments without repeating common elements whether or not expressly stated to so relate. Similarly, alternatives described for elements used in more than one embodiment are understood to describe alternative embodiments for each of the described embodiments having that element.

In any of the embodiments described herein, additional data should logically include, but not be limited to, the digital imaging system parameters including the imaging device identification, information about the images such as pixels per frame, and description of the spectral characteristics of the stimulating rays used to locally illuminate the parcel so that the same spectral characteristics are used in making a subsequent second digital image. In addition, information about the spatial location of the image device used in producing the birth certificate data and their orientation will assist in making computerized comparisons that assess and identify any tamper.

The described embodiments are illustrative and the above description may indicate to those skilled in the art additional ways in which the principles of this invention may be used without departing from the spirit of the invention. Accordingly, the scope of each of the claims is not to be limited by the particular embodiments described.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

Preferred Embodiment

Low cost and ease of use is very important because of the huge volume of goods shipped every day and the number of points of origination. In a preferred embodiment the packages would be mass produced with government approved embossed or embedded fluorescent media that are naturally safe and are fluorescent or doped to respond to the stimulating rays. If not mass produced, a second preference would be typical commercial polymer film, of the type used to wrap foods, embossed or embedded with naturally safe fluorescent artifacts as the wrapping media. Another low cost alternative would be bags of typical polymer film used to encapsulate foods that would have embedded or embossed fluorescent artifacts, either naturally occurring or which are doped to respond to stimulating rays. In a preferred embodiment, the choice of dopant is selected for fluorescing in yellow, red, green or other color when exposed to stimulus rays such as ultraviolet rays.

In a preferred embodiment, the packaging for encapsulating letters and small parcels would be mass-produced and would not require shrink-wrapping. However, shrink-wrapping with thermally sensitive polymer film can be accomplished by momentary heating with infrared heaters or hot air ducts to achieve a tight conformal coating. For example, several security stickers imprinted with UV-responsive ink would provide means for triangulation to orient digital images taken with cameras during exposure to the UV light.

In a preferred embodiment, the sources of stimulating rays would be selected for low cost, broad availability and stability.

In a preferred embodiment, the imaging devices would be low cost and commercially available.

In a preferred embodiment, the cloud environment would be secure, protected from tampering to assure that the package image data is not compromised. Additionally, the data would be encrypted.

In a preferred embodiment, the digital data of images can be scanned or captured by cameras or other non-contact imaging devices that provide non-contact or touchless detailed digitized optical information at a resolution high enough to record all the necessary detail and the images would be collected from perspectives of the entity surfaces. In a preferred embodiment, several imaging devices would be positioned to assure full coverage with minimal overlapping coverage so that all portions of the surface are recorded.

In a preferred embodiment, security symbols on or in the media would provide reference for triangulation to register first images for comparison with first images taken during transit. The digitized image data associated with the parcel is such that a change in the spectral parameters can be detected once the images are oriented. In a further embodiment, the entity parameters include physical dimensions, such as weight, and the related data is secured using cryptographic techniques, such as spaying a pattern with UV-sensitized ink.

In a preferred embodiment, the parcel would be tested for tamper at each waypoint along the route to destination, as well as at the final destination, to assure knowing a parcel is tampered or not.

In a preferred embodiment, the computer algorithm for determining tamper involves empirically measuring the deviations of measurements of a subsequent second image data from the same locations in initial digital image data.

In a preferred embodiment, the algorithm employed in digital processing involves using commercially available software that provides inverse models for classifying and identifying the probability (likelihood) of differences in image data. Mathematicians are in general agreement that there are two approaches, 1) Frequentist and 2) Bayesian. The Frequentist approach is called "Frequentist" because it is concerned with the frequency with which one expects to observe assumed fixed data, given the development of some hypothesis about the population. This supports the best determination of P(D|H), i.e., the probability P of the data D, given the hypothesis H, within a model. Frequentist methods currently employ commercially available software libraries to perform the inverse method. The Frequentist approach accounts for the situation where if a comparative study is repeated, the data might come out differently); and hypotheses as deterministic (either true or false); i.e., makes a statement about the hypothesis ("the parcel has a tamper") with respect to the data. In a Frequentist approach, the data is evaluated to determine which outcome is the case. Frequentist analysis does not determine that there is no tamper. Rather, it uses abductive logic that identifies that the data are inconsistent with the hypothesis that the system has no tamper. In order to estimate the likelihood of the tamper (i.e., the probability that the hypothesis, "there is a tamper" is true), the analyst is forced to use a Bayesian inverse modeling approach that treats the data as fixed (these are the only data available) and hypotheses as random (the hypothesis might be true or false, with a nondeterministic probability between 0 and 1).

In a preferred embodiment, a Bayesian approach is appropriate when the parameters are likely to change over time due to stresses of a dynamic system, which logically includes dynamic shipping systems with distributed temporal delays, loading and unloading, in multiple transport domains and conditions.

In fingerprint analyses, the numerical values of pixels in the matrix of the image set are used to identify loops, whorls, and other features in the fingerprint. It is intuitive that digital image data of parcels according to the present invention for identifying tamper can be similarly searched and classified to locate reference points for orientation of digital image data.

In a preferred embodiment, locator symbols are included in the parcel media design. By having the locator symbols, the analytic procedure can locate a feature or centroid as point of reference. However, if locator symbols or other reference points are not used, the tamper algorithm can use image data to locate surrogate reference points by searching the pixel values for one or more patterns in the birth certificate image data.

In accordance with the current patent, when damage or tampering occurs, portions of the media are displaced, causing changes in the pattern of illumination in the proximity of the tamper or damage. In a preferred embodiment, the process for probabilistically identifying tamper or not is to employ a search algorithm such as, but not limited to, a Frequentist model, that begins a starting point and calculates statistical differences in the digital values of the pixels in the birth certificate digital image data and the matching cell or proximal pixel in the matrix of current image data. Areas wherein pixel values in several proximal cells exhibit substantial difference from values in the birth certificate image pixels will, according to deterministic inverse model theory, assess the probability of a match given the differences in values, providing basis to calculate the likelihood of tamper.

Operation of the Preferred Embodiment

The descriptions of the drawings have illustrated how the tamper detection system works as a mobile system for continuous tamper situation awareness with an embedded device, as well as without an embedded device utilizing stations at the point of origin, at transfer points, and a destination.

In a preferred embodiment for a non-embedded system for identifying parcel tamper, the system comprises creating a protective parcel by encapsulating a good with media purposely constructed to produce a unique signature when the media is exposed to stimulating photons from a light source. Image sensors, controlled by a first processor, produce pixel images of surfaces of the parcel comprising a parcel identifier data and a parcel image data. A second processor in communication with the first processor is configured to execute algorithms for receiving the parcel data and recording the data and identifier data in a database. In a preferred embodiment, the database is encrypted.

At a transfer point, a similar system records a second image data, comprising the parcel identifier data and a parcel image data. The processor at the transfer point retrieves said parcel birth image data assigned to the identifier, executes a tamper analysis on the parcel birth image data and second image data, and outputs a tamper status signal.

In a preferred embodiment for a mobile embedded system for identifying parcel tamper, the system is contained in the parcel having an embedded device that controls image sensors, which produce a birth data of said parcel comprising a parcel identifier data and a parcel birth image data. According to programming, the embedded device executes algorithms for 1) receiving the parcel birth data; 2) recording a second image data, comprising the parcel identifier data and a parcel image data, retrieving said parcel birth image data assigned to the identifier; and 3) a tamper analysis on the parcel birth image data and second image data and outputting a tamper status signal.

Tractability of the process is very important due to the size of the pixel matrix. To a person of average skill in employing statistical analyses, the analytic procedure to perform tamper detection would not be a challenging task. The Frequentist inverse method using differences can identify when the probability of tamper indication exceeds some threshold. Selection of the Bayesian procedure should be based on an optimization function over −i(cost)+v(information). This calculation should be informed by knowledge of the expected range of outcomes of the test in context, (i.e., how likely is it that the procedure will produce useful information in this context?).

In a preferred embodiment, the current patent would operate by employing an algorithm to quickly locate the boundaries of coloration in the digital image, and then employ a Frequentist method to efficiently inverse model the boundary areas. The hypothesis being the boundary area is in a healthy, untampered state, (P(Data|Untampered)). If there are areas that do not satisfy the health untampered criteria, shift to the Bayesian inverse method to traverse hypotheses of not-so healthy states to determine the probability of tamper given the data of (P(Data|Tampered)). In a preferred embodiment the process would, without limitation, follow the following algorithm:

1) Using a wavelet algorithm orient the current image data by searching the pixel matrix for matches of identifiers in the birth certificate image data. (In an ideal embodiment, there are identifier symbols for orientation.)
2) Use difference-of-pixel-data driven (Frequentist) pixel monitoring to compare signatures and features for anomalies in the current digital image data versus the birth certificate digital image data. This comparison provides: 1) dimensionality reduction; 2) providing uncertainty measures for the propagation of uncertainty in the Bayesian inverse method; and 3) discretize the distribution for the Bayesian method. The uncertainty measures could be, for example, without limitation: 1) untampered true, 2) untampered false, 3) untampered uncertain.

3) When a potential tamper is identified, use Bayesian method to test hypothesizes of the potential tamper modes associated with data.

4) Calculate probability of each hypothesis based on context and test results.

5) For each hypothesis, use Bayesian method to calculate levels of risk for the potential consequences based on context 6) Calculate the confidence for each hypothesis using, for example, the Dempster and Shafer "Rule of Combination," which integrates lack of information into the leaf nodes (priors) and propagates this uncertainty to the posterior probability.

7) Calculate level of risk based on uncertainty, confidence, and context.

8) Produce tamper signal indicative of probability of risk

Monitoring would be implemented using a matrix combination of indicators. There can be several indicators combined into a single indicator using a matrix approach: multiply the current value of each indicator by the Correlation Index (CI) between the indicator and a tamper and sum over all indicators.

Investigation of tamper would be implemented by a hypothesize-and-test loop of the type show below:

Loop

Select best Bayesian inverse analysis procedure (based on leading hypotheses and associated procedures)

Run test and gather data

Update hypothesis likelihood based on new data

Reorder hypotheses by likelihood

Until Terminate Condition=True

Terminating the hypothesize-and-test loop should depend on both the value of information expected and available user resources. There is a point of diminishing returns, and this point is reached when the next test is expected to produce only marginally useful information. The next test may also be unnecessary if the tamper is suspected to be marginal or if visual inspection is planned soon.

After the hypothesize-and-test loop is terminated, there will typically remain one-or-more hypotheses ranked by order of likelihood. At this point, it is then useful to calculate the level of risk based on a range of potential options or maintenance actions.

Calculation of confidence uses the Uncertain Bayes Network (UBN) approach that integrates uncertainty associated with lack of information. An Uncertain Bayes Network is a special case of a Bayesian Network with the additional property of representing uncertainty explicitly via the Dempster-Shafer theory of information. Uncertain Bayes Network's represent the lack of knowledge or noise attached to prior distributions, and propagate this uncertainty through the network. This allows us to consider likelihood of an event in combination with confidence that the likelihood is accurate.

Calculation of Total Risk is based on:

1) The hypothesis list

2) The probability of imminent risk given the tamper state

3) The cost of the risk

In calculating risk, start from a list of tamper hypotheses and their likelihoods. Also, estimate the probability of an imminent danger given each tamper state. The window for "imminent" is defined in practice by operational safety requirements. Given estimates of the cost of danger for each tamper state, then calculate Total Risk using the following two steps:

$$\text{Total Cost} = \sum_i P(Event_i) * Cost_i \text{ and}$$

$$P(\text{event}) = P(\text{tamper-hypothesis}) * P(\text{tamper} \mid \text{data})$$

In a preferred embodiment, there is included a means to determine uncertainty which results from a combination of factors, missing evidence, belief in data sources, and the limitation of the inverse model designer's knowledge and rules. The Dempster-Shafer model considers sets of propositions about a domain of interest and assigns a belief measure to each an interval in which the degree of belief must lie. This belief measure ranges from zero, indicating no evidence of support, to one, denoting certainty. The plausibility of a proposition, also ranging between zero and one, is defined as one minus the belief of the proposition being false. Based on this assumption, evidence and the belief in an assumption are related. For example, if we have very strong belief that evidence is false, then its plausibility will be near zero.

The Uncertain Bayes Network approach is a specification of a Bayesian network in which variables that are not conditioned on any other variables (called leaf nodes in this implementation) can be treated essentially as a Dempster Shafer event. For these variables, one or more "experts" will provide one or more priors. Binary variables are assumed for simplicity. The priors will be in the form: P(X=T), P(X=F) where P(X=T)+P(X=F)<=1.0. This diverges from probability theory in that the probabilities do not have to sum to 1.0. Instead, the remainder (U=1−P(X=T)+P(X=F)) is the uncertainty factor. Essentially, an individual will provide his or her belief in the true and false states of a variable by providing mass for T and F. Any remaining value indicates a lack of knowledge about the state and is equivalent to the universal set TF. Thus, if a person has evidence that indicates that a tamper event is 40% likely and another piece of evidence that indicates that it is 30% unlikely, there is 30% gap that indicates uncertainty. Multiple sensors could also provide the evidence. Suppose that each of k sensors can provide positive evidence of an event. If a sensor is 100% certain about its observation, it will provide 1.0/k percent of the evidence to indicate an event. If all sensors are 100% certain, then the event is 100% likely to occur. However, if one or more of the k sensors is uncertain in its evidence, this does not necessarily mean that it is certain that the event will not Occur.

Any alternate beliefs in the state of a leaf node will be combined using Dempster's rule of combination. Dempster's rule of combination has the benefit of increasing confidence in an event when there is consensus in the event.

The internal nodes in the Uncertain Bayes Network act much like nodes in a Bayesian network. Each node conditioned on other nodes maintains a conditional probability table (CPT) indicating its probability given its parents. The conditional probability table must behave as Bayesian CPTs and does not need to represent the uncertainty. Inference proceeds as in a Bayesian network with the distinction that the uncertainty is propagated as well. In other words, if the beliefs for each variable's values do not add to 1.0, the distribution is not normalized. Therefore, the uncertainty is maintained only in a variable's posterior probability.

Consensus between multiple experts may counter the uncertainty, creating a natural representation of human reasoning. For instance, if a person is unsure of tamper, he or she might seek out evidence to support that fact—increasing our confidence in the fact once we find supporting evidence. Conflicting evidence is not handled well using Dempster's combining rule, however this can be addressed using a Factored Belief Aggregation approach taught in computer science textbooks.

CONCLUSIONS, RAMIFICATIONS, AND SCOPE

The present invention has been described in terms of the preferred embodiment, and it is recognized that equivalents, alternatives, and modifications, aside from those expressly stated, are possible and within the scope of the appending claims. While the foregoing written description of the invention enables one of ordinary skill to make and use what is considered presently to be the best mode thereof, those of ordinary skill in preparing goods for secure shipment will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

Thus, the present invention is not intended to be limited to the embodiments shown herein, but is to be accorded the widest scope consistent with the principles and novel features disclosed herein and as defined by the following claims.

What is claimed is:

1. A system for protecting parcels from tamper comprising:
   - a substrate film comprising artifacts exhibiting multi-spectral signature when exposed to certain stimulating photons of at east two controlled wavelength;
   - a parcel in association with an embedded processor, said parcel and said embedded processor wrapped with said film;
   - a source of said certain stimulating photons;
   - a first multi-spectral imaging sensor configured for processing at a first location and time, a first multi-spectral signature of said artifacts into a first digital image data and for transmitting a first digital information comprising said first digital image data, a parcel identifier data, and a date-time data to a cloud processing environment and said embedded processor; and
   - a second multi-spectral imaging sensor configured for processing, at a second location and time, a second multi-spectral signature of said artifacts into a second digital image data and for transmitting a second digital information comprising, said second digital image data to said cloud processing environment or said embedded processor.

2. An automated implemented system to detect tamper of a parcel comprising:
   - a media comprising:
     - at least one substance selected from the group consisting of paper, metal, and polymer; and
     - at least one material selected from the group consisting of doped substances, scintillating substances, paint, strips, strands, filaments, and fragments, wherein all said substances, paint, strips, strands, filaments and fragments exhibit multi-spectral signature when exposed to certain photons of at least two controlled wavelength;
   - a parcel in association with an embedded processor, said parcel and said embedded processor encapsulated with said media;
   - at least two apparatus configured with means for digitizing multi-spectral signatures; and
   - means, in communication with said at least two apparatus, for transmittal to a cloud environment and said embedded processor a digital data comprising a parcel identifier data and a first multi-spectral signature pixel data collected during an exposure of said encapsulated parcel to said certain photons.

3. The system of claim 2 further comprising at least one processor in the cloud environment, said processor configured with means for recording, retrieving, performing tamper analyses, and transmitting the tamper signal.

4. The system of claim 2 wherein the polymer is selected from the group consisting of polypropylene, polyvinyl, and polyester.

5. An embedded implemented system to identify tamper of an item comprising:
   - a media comprising a plurality of embedded or embossed or attached artifacts that emit unique multi-spectral signatures when exposed to certain photons of at least two different controlled wavelengths;
   - an item in association with an embedded processor, said item and said embedded processor encapsulated within said media;
   - a source of said certain photons;
   - two or more sensors for producing a digital birth certificate image data representing said unique multi-spectral signatures and for communicating said digital birth certificate image data to a cloud environment and said embedded processor;
   - said cloud environment and said embedded processor are configured to record the digital birth certificate image data in a database and to execute a tamper detecting algorithm to perform a statistical comparison of the differences between said digital birth certificate image data and a current image data, and to output a tamper signal.

6. The system of claim 5 wherein the embedded processor is in communication with the cloud environment, said cloud environment comprised of one or more computers and means for storing digital data.

7. The system of claim 6 wherein the one or more computers are configured to receive a tamper signal and to send a tamper message.

8. The system of claim 1 wherein said cloud processing environment and embedded processor are configured for receiving, storing, and processing said first digital information and said second digital information with a tamper detection algorithm for comparing said first and second digital informations and for detecting any difference between said first and second multi-spectral signatures, and, when a difference is detected, for outputting a tamper signal indicative of a disruption of film integrity.

9. The system of claim 2 wherein the cloud environment and said embedded processor are configured to receive the digital data and to execute a tam er detection algorithm on the digital data in conjunction with a second multi-spectral signature pixel data associated with the parcel identifier data and to output a tamper signal, said tamper detection algorithm comprising a Frequentist inverse modeling algorithm and/or a Bayesian inverse modeling algorithm for comparing multi-spectral signature pixel data.

* * * * *